(12) United States Patent
Vityaz

(10) Patent No.: US 11,580,524 B2
(45) Date of Patent: Feb. 14, 2023

(54) AUTOMATED DIGITAL METHOD AND SYSTEM OF PROVIDING OR SHARING ACCESS

(71) Applicant: Middleware, Inc., Wilmington, DE (US)

(72) Inventor: Oleksandr Vityaz, Dnipro (UA)

(73) Assignee: Middleware, Inc., Wilmington, DE (US)

(*) Notice: Subject to any disclaimer, the term of this patent is extended or adjusted under 35 U.S.C. 154(b) by 0 days.

(21) Appl. No.: 16/519,337

(22) Filed: Jul. 23, 2019

(65) Prior Publication Data

US 2020/0051060 A1 Feb. 13, 2020

Related U.S. Application Data

(63) Continuation of application No. 15/721,401, filed on Sep. 29, 2017, now Pat. No. 10,776,772.

(60) Provisional application No. 62/401,968, filed on Sep. 30, 2016, provisional application No. 62/404,802, filed on Oct. 6, 2016.

(51) Int. Cl.
*G06Q 20/10* (2012.01)
*G06Q 20/34* (2012.01)
*G06Q 20/32* (2012.01)
*G06F 21/62* (2013.01)

(52) U.S. Cl.
CPC ..... *G06Q 20/3278* (2013.01); *G06F 21/6245* (2013.01); *G06Q 20/10* (2013.01); *G06Q 20/105* (2013.01); *G06Q 20/1085* (2013.01); *G06Q 20/34* (2013.01); *G06Q 20/351* (2013.01)

(58) Field of Classification Search
None
See application file for complete search history.

(56) References Cited

U.S. PATENT DOCUMENTS

| | | |
|---|---|---|
| 5,677,955 A | 10/1997 | Doggett et al. |
| 5,832,089 A | 11/1998 | Kravitz et al. |
| 5,963,647 A | 10/1999 | Downing et al. |

(Continued)

OTHER PUBLICATIONS

U.S. Non-Final Office Action dated Apr. 3, 2019 cited in U.S. Appl. No. 15/721,401, 26 pgs.

(Continued)

*Primary Examiner* — Joseph W. King
(74) *Attorney, Agent, or Firm* — Bekiares Eliezer LLP

(57) ABSTRACT

Advantageously, the invention is a competitor to money transfer systems. Conventional digital transactions facilitate electronic payment, such as money transfers, payment card charges, e-commerce transactions and other types of transactions. However, payees may be unbanked people (e.g., children) or people with no payment card (e.g., may have lost card), and payment card fund transfers may be expensive, time consuming, and cumbersome for financial institutions. Thus, there is need for an improved approach. The invention discloses an automated digital method of providing or sharing access to a payment card and/or similar financial account or non-card product, transactions between individuals or legal entities without physical transmission of a payment card, non-card product or its credentials, even without a recipient of an access having a payment card and/or financial account or non-card product, particularly by providing or sharing access to a payment card and/or similar financial account or non-card product of a sender.

12 Claims, 5 Drawing Sheets

(56) References Cited

U.S. PATENT DOCUMENTS

| | | |
|---|---|---|
| 6,000,832 A | 12/1999 | Franklin et al. |
| 6,065,675 A | 5/2000 | Teicher |
| 6,317,745 B1 | 11/2001 | Thomas et al. |
| 6,754,484 B1 | 6/2004 | Hiltunen et al. |
| 6,975,937 B1 | 12/2005 | Kantarjiev et al. |
| 7,107,247 B2 | 9/2006 | Kinoshita et al. |
| 7,289,964 B1 | 10/2007 | Bowman-Amuah |
| 7,370,013 B1 | 5/2008 | Aziz et al. |
| 7,395,241 B1 | 7/2008 | Cook et al. |
| 7,461,265 B2 | 12/2008 | Ellmore |
| 7,487,127 B2 | 2/2009 | Weichert et al. |
| 7,641,109 B2 | 1/2010 | Seifert et al. |
| 7,711,603 B2 | 5/2010 | Vanker et al. |
| 7,780,075 B2 | 8/2010 | Cooper et al. |
| 7,840,486 B2 | 11/2010 | D'Agostino |
| 7,870,065 B2 | 1/2011 | Gutierrez-Sheris |
| 7,895,122 B2 | 2/2011 | Flitcroft et al. |
| 7,945,512 B2 | 5/2011 | Scipioni et al. |
| 8,015,084 B1 | 9/2011 | Hirka et al. |
| 8,682,802 B1 | 3/2014 | Kannanari |
| 8,713,454 B2 | 4/2014 | Sriraghavan et al. |
| 8,870,659 B2 | 10/2014 | House et al. |
| 9,053,165 B2 | 6/2015 | van Rossum |
| 9,060,036 B2 | 6/2015 | Diab et al. |
| 9,110,711 B2 | 8/2015 | Abdelaziz et al. |
| 9,159,048 B2 | 10/2015 | Goodwin et al. |
| 9,286,603 B2 | 3/2016 | Fung et al. |
| 9,330,145 B2 | 5/2016 | Satyanarayanan |
| 9,336,278 B2 | 5/2016 | Procopio et al. |
| 9,350,824 B2 | 5/2016 | Rajakarunanayake et al. |
| 9,351,193 B2 | 5/2016 | Raleigh et al. |
| 9,354,796 B2 | 5/2016 | Puckett |
| 9,768,969 B2 | 9/2017 | Weinstein et al. |
| 9,818,139 B1 | 11/2017 | Shekhar et al. |
| 9,912,816 B2 | 3/2018 | Ristock et al. |
| 10,776,772 B2 | 9/2020 | Vityaz |
| 10,853,855 B2 | 12/2020 | John |
| 11,257,066 B2 | 2/2022 | Vityaz |
| 2001/0047285 A1 | 11/2001 | Borders et al. |
| 2002/0082962 A1 | 6/2002 | Farris et al. |
| 2003/0126083 A1 | 7/2003 | Seifert et al. |
| 2003/0163432 A1 | 8/2003 | Cannon, Jr. |
| 2005/0027580 A1 | 2/2005 | Crici et al. |
| 2005/0091161 A1 | 4/2005 | Gustin et al. |
| 2005/0108155 A1 | 5/2005 | Gallagher et al. |
| 2005/0169461 A1 | 8/2005 | Canard et al. |
| 2005/0222961 A1 | 10/2005 | Staib et al. |
| 2006/0064378 A1 | 3/2006 | Clementz et al. |
| 2006/0149667 A1 | 7/2006 | Barry |
| 2006/0173793 A1 | 8/2006 | Glass |
| 2006/0191999 A1 | 8/2006 | Stoutenburg et al. |
| 2006/0195567 A1 | 8/2006 | Mody et al. |
| 2006/0259359 A1 | 11/2006 | Gogel |
| 2007/0045395 A1 | 3/2007 | Corona et al. |
| 2007/0050291 A1 | 3/2007 | Avazian et al. |
| 2007/0078760 A1 | 4/2007 | Conaty et al. |
| 2007/0288247 A1 | 12/2007 | Mackay |
| 2008/0000964 A1 | 1/2008 | Flake et al. |
| 2008/0004949 A1 | 1/2008 | Flake et al. |
| 2008/0052182 A1 | 2/2008 | Marshall |
| 2008/0052206 A1 | 2/2008 | Edwards et al. |
| 2008/0082444 A1 | 4/2008 | Keohane et al. |
| 2008/0103786 A1 | 5/2008 | Zhang et al. |
| 2008/0133390 A1 | 6/2008 | Scipioni |
| 2008/0140568 A1 | 6/2008 | Henry |
| 2008/0162348 A1 | 7/2008 | Lee et al. |
| 2008/0228637 A1 | 9/2008 | Scipioni et al. |
| 2008/0228638 A1 | 9/2008 | Scipioni et al. |
| 2009/0043696 A1 | 2/2009 | Ornce et al. |
| 2009/0150294 A1 | 6/2009 | March et al. |
| 2009/0210347 A1 | 8/2009 | Sarcanin |
| 2009/0327099 A1 | 12/2009 | Patel et al. |
| 2010/0023450 A1 | 1/2010 | Scipioni |
| 2010/0161485 A1 | 6/2010 | Bulawa et al. |
| 2010/0205095 A1 | 8/2010 | Ostrovsky |
| 2010/0299259 A1 | 11/2010 | Walker et al. |
| 2010/0312617 A1 | 12/2010 | Cowen |
| 2011/0112970 A1 | 5/2011 | Yu |
| 2011/0202462 A1 | 8/2011 | Keenan |
| 2011/0243553 A1 | 10/2011 | Russell |
| 2012/0310827 A1 | 12/2012 | Gibson, III |
| 2013/0006782 A1 | 1/2013 | Schwarzkopf et al. |
| 2013/0275301 A1 | 10/2013 | Lehman et al. |
| 2014/0236831 A1 | 8/2014 | Flitcroft et al. |
| 2014/0237562 A1 | 8/2014 | Nandakumar |
| 2015/0127547 A1 | 5/2015 | Powell et al. |
| 2016/0224977 A1 | 8/2016 | Sabba et al. |
| 2016/0342992 A1 | 11/2016 | Lee |
| 2017/0300907 A1 | 10/2017 | Shanmugam |
| 2018/0144335 A1 | 5/2018 | Vityaz |
| 2020/0167761 A1 | 5/2020 | Vityaz |

OTHER PUBLICATIONS

Foltz et al., "Sharing Smart Card Authenticated Sessions Using Proxies," Jan. 2016, Institute for Defnce Analyses, 22 pgs.

All You Need to Know About Tokenization (Visa Security Tokenization Infographic), 1 pg.

U.S. Final Office Action dated Oct. 22, 2019 cited in U.S. Appl. No. 15/721,401, 26 pgs.

Copending U.S. Appl. No. 16/774,284, filed Jan. 28, 2020.

Non-Final Office Action dated Apr. 15, 2021 cited in U.S. Appl. No. 16/774,284, 27 pgs.

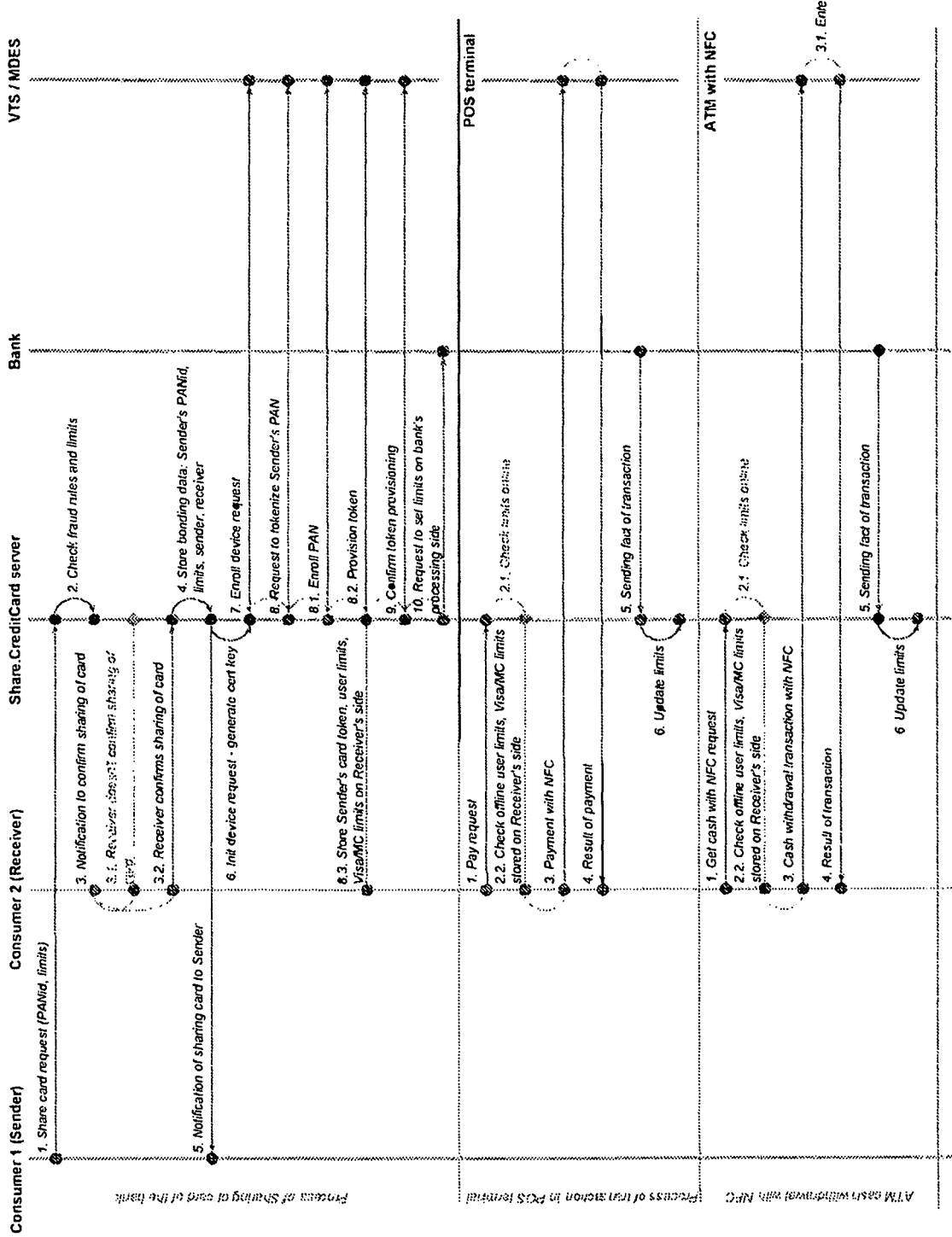

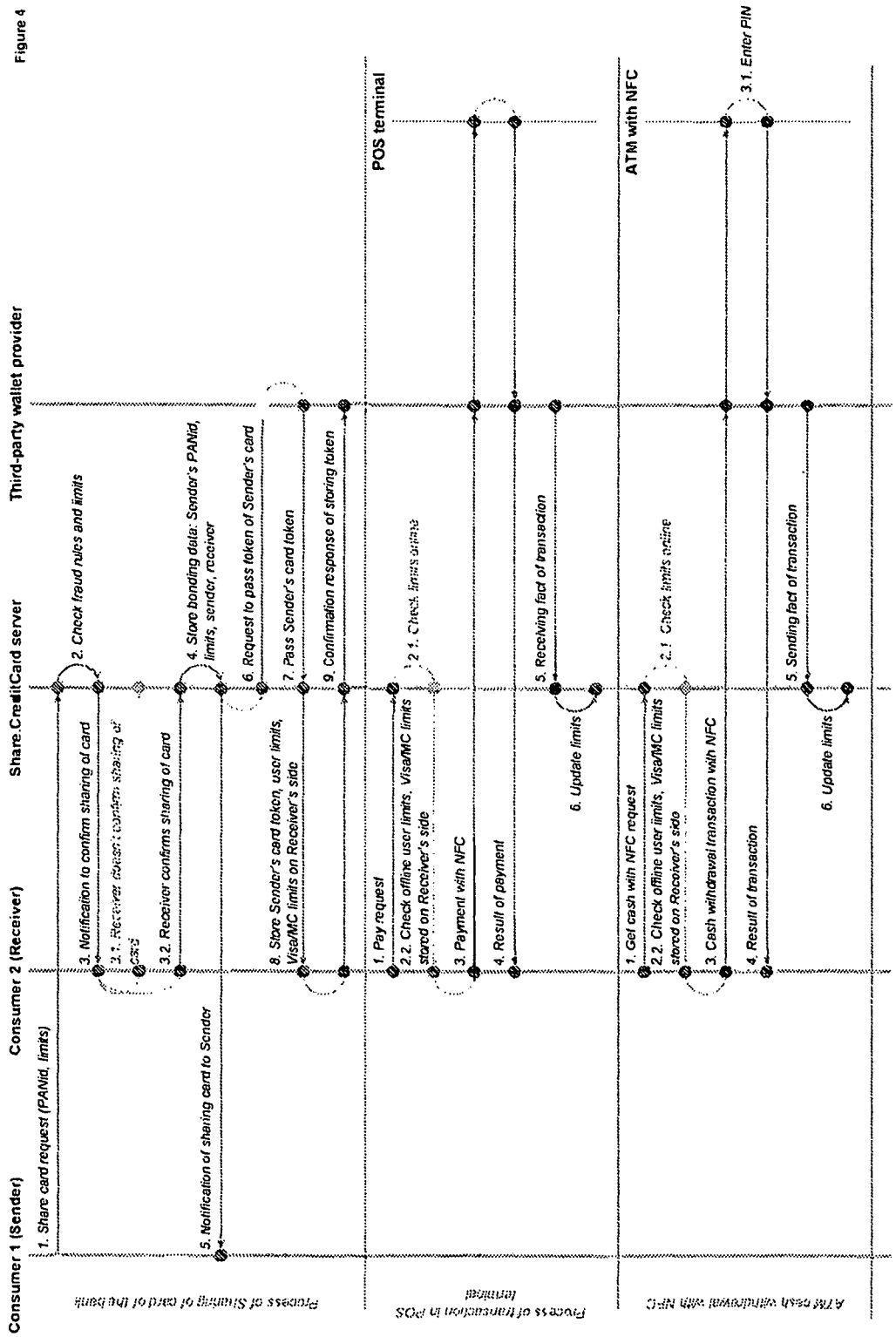

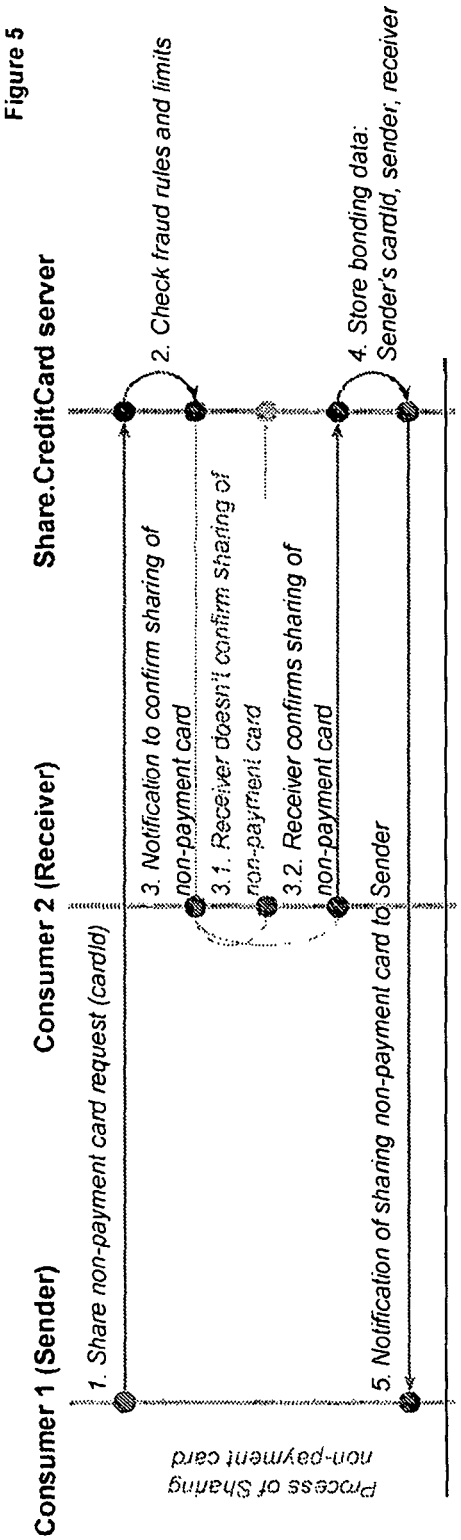

AUTOMATED DIGITAL METHOD AND SYSTEM OF PROVIDING OR SHARING ACCESS

RELATED APPLICATIONS

This application is a continuation of U.S. application Ser. No. 15/721,401 filed Sep. 29, 2017 entitled "Automated Digital Method and System of Providing or Sharing Access, which claims priority to U.S. Provisional Application No. 62/401,968 for "Method of payment by sharing access to a payment card of one bank (Share credit card)", filed on Sep. 30, 2016, and claims further priority to U.S. Provisional Application No. 62/404,802 for "Method of payment by sharing access to a payment card (Share credit card)" filed on Oct. 6, 2016, which are incorporated herein by reference.

FIELD OF INVENTION

The invention pertains to digital method and system of providing or sharing access to payment cards, to non-payment cards including but, not limited to, various cards (such as SIM cards, discount cards, gift cards, ID cards etc.), to non-card products including but, not limited to, various products (such as data, information, cars, vehicles, any type of tickets, coupons, vouchers etc.).

BACKGROUND OF INVENTION

With Regard to an Automated Digital Method of Providing or Sharing Access to Payment Cards:

Conventional digital transactions facilitate electronic payment, such as money transfers, payment card charges, e-commerce transactions and any other types of transaction. However, in multiple circumstances, payees may be unbanked people (e.g., children that need money to buy something) or may have no payment card (e.g., may lost card), while payment card fund transfers may be expensive, time-consuming, and cumbersome for financial institutions. Thus, there is need for an improved approach.

With Regard to Digital Method of Providing or Sharing Access to Non-Payment Cards and/or to Non-Card Products:

A person may need to delegate his or her right or obligation provided by the non-payment card and/or by the non-payment product to another person for any particular reason. The delegation of the rights or obligations provided by the non-payment card and/or by the non-card product is impossible without physical transmission of such non-payment card and/or a non-card product, or credentials of such non-payment card and/or a non-card product. However, such persons may be in different places. Thus, there is need for an improved approach.

SUMMARY

With Regard to an Automated Digital Method of Providing or Sharing Access to Payment Cards:

Access to a payment card and/or similar financial account, transacts between individuals or legal entities without physical transmission of a payment card or its credentials, even without a recipient of an access having a payment card and/or financial account, particularly by providing or sharing access to a payment card and/or similar financial account of a sender. Shared access to a payment card and/or similar financial account may transact access to such a payment card and/or similar financial account instantly via various channels remotely using digital token of the sender's payment card and/or similar financial account or another applicable identifier. Recipient of the shared access may use such shared access to the sender's payment card and/or similar financial account to make payments using digital token via NFC enabled devices and/or using QR code and/or any other universal platform, for withdrawing money from Automated Teller Machine (ATM), making payments via Point Of Sale (POS) terminal, making e-commerce transactions, money transfers, fund disbursements and/or another type of transactions subject to conditions set by the sender (optionally), but without transferring money between individual, corporate, and/or business payment card or similar financial accounts. Advantageously, banks or other financial institutions may not participate to settle payments, thereby economically benefiting sender and/or recipient by avoiding payment fees, delay, and other resources. Thus, for example, access to a payment card and/or similar financial account, and fund access as derivative may be accomplished via money transfer between payment cards and/or similar financial accounts, as well as through digital method of providing or sharing of access to individual, corporate, and/or business a payment card and/or similar financial account. Optionally, sender may provide or otherwise share access to a payment card and/or similar financial account remotely using network-accessible device (such as smartphone, tablet, smartwatch, laptop, etc.) configured with Near Field Communication (NFC) (optionally), Special Mobile Application (SMA) (optionally), or SMA web version instead (optionally). It is contemplated herein that sender does not need NFC enabled smartphone or another network-accessible device, (such as tablet, smartwatch, laptop, etc.) since, sender may provide access to the payment card and/or similar financial account without using NFC function; thus, the sender may use SMA or web version instead (optionally). Recipient needs smartphone or another network-accessible device (e.g., tablet, smartwatch, laptop, etc.) configured with NFC (optionally) to receive access to a payment card and/or financial account, alternatively and to make transactions using such access. If either recipient's or merchant's device does not support NFC technology, the recipient may make transactions using Quick Response Code (a machine-readable optical label that contains information about the item to which it is attached) with digital token or merchant payment credentials encoded in it (optionally) (e.g., mVisa) (hereinafter—"QR code") or any other universal platform. Recipient device may be configured to access the sender's payment card and/or similar financial account via receipt of digital token, thereby enabling individual or legal entity with such recipient device effectively to access sender's payment card and/or similar financial account, applicable to transact using NFC enabled devices or using QR code or any other universal platform, subject to conditions set by sender (optionally). For example, by withdrawing money from Automated Teller Machine (ATM), making payments via Point Of Sale (POS) terminal, making e-commerce transactions, money transfers, fund disbursements and/or another type of transactions.

An automated digital method of providing or sharing access to payment card and/or similar financial account is initially cloud based technology, but also can be deployed to private cloud, in-house, on-premises, and/or to other type of environment.

An automated digital method of providing or sharing access to payment cards and/or similar financial accounts may be used by including, but not limited to:

(i) banks or financial institutions that have integrated Visa Token Services (VTS), MasterCard Digital Enablement Service (MDES) or other similar service and receive digital tokens, (ii) banks or financial institutions that have not integrated VTS, MDES or other similar service yet and are not able to receive digital tokens, (iii) third-party wallet providers (such as Apple Pay, Google Wallet, Samsung pay, Android Pay etc), that receive digital token of payment card and/or similar financial account through integration with VTS, MDES and/or issuing bank and/or other similar service. With Regard to an Automated Digital Method of Providing or Sharing Access to Non-Payment Cards and/or to Non-Card Products:

Access to the rights and/or obligations or access provided by non-payment card and/or similar non-payment account and/or non-card product transacts between individuals or legal entities without physical transmission of a non-payment card or its credentials, and/or non-card product or its credentials particularly by providing or sharing access to a non-payment card and/or similar non-financial account and/or non-card product of a sender. Proposed digital method and system of providing or sharing access to non-payment cards and/or similar non-financial accounts and/or non-card products transact access to the rights and/or obligations or access provided by such non-payment card and/or similar non-financial account and/or non-card product subject to conditions set by the sender (optionally), but without transferring non-payment card and/or similar non-financial account and/or non-card product or its credentials between individuals or legal entities. Advantageously, non-payment card and/or non-financial account and/or non-card product issuer may not participate to share or provide access to non-payment card and/or similar non-financial account and/or non-card product, thereby benefiting sender and/or recipient by avoiding additional costs, delay, and other resources. Thus, for example, access to the rights and/or obligations or access provided by the non-payment card and/or similar non-financial account and/or non-card product may be accomplished via such non-payment card and/or non-card product transmitting, as well as through providing or sharing of access to non-payment card and/or similar non-financial account and/or non-card product. Optionally, sender may provide or otherwise share access to non-payment card and/or similar non-financial account and/or non-card product remotely using network-accessible device (such as smartphone, tablet, smartwatch, laptop, etc.) configured with Near Field Communication (NFC) (optionally), Special Mobile Application (SMA) (optionally), or SMA web version instead (optionally). Recipient needs smartphone or another network-accessible device (e.g., tablet, smartwatch, laptop, etc.) configured with NFC (optionally) to receive access alternatively. If either recipient's or merchant's device does not support NFC technology, the recipient may use such non-payment card and/or similar non-financial account and/or non-card product for any purpose using QR code or any other universal platform. Recipient device may be configured to access sender's non-payment card and/or non-financial account and/or non-card product, thereby enabling individual or legal entity with such recipient device effectively to receive and use access to the sender's non-payment card and/or similar non-financial account and/or non-card product, subject to conditions set by sender (optionally).

An automated digital method of providing or sharing access to a non-payment card and/or similar non-financial account or non-card product is initially cloud based technology, but can be deployed to private cloud, in-house, on-premises, and/or to other type of environment.

BRIEF DESCRIPTION OF FIGURES

FIG. 3 illustrates representative method embodiment diagram including general share process that may be implemented by banks or financial institutions that have not integrated VTS, MDES or other similar service and are not able to receive digital tokens of payment cards and/or similar financial accounts.

FIG. 4 illustrates representative method embodiment diagram including, general share process that may be implemented by third-party wallet providers (such as Apple Pay, Google Wallet, Samsung pay, Android Pay etc.), that receive digital token of payment card and/or similar financial account through integration with VTS, MDES and/or issuing bank and/or other similar service.

FIG. 5 illustrates representative method embodiment diagram including general process of providing or sharing access to non-payment cards and/or similar non-financial accounts or non-card product.

DETAILED DESCRIPTION

Figure 1:
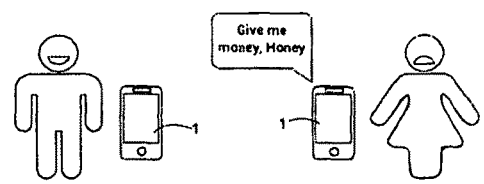
FIG. 1 illustrates conceptual scheme of a digital method of providing or sharing access to a payment card and/or similar financial account.
Figure 1:
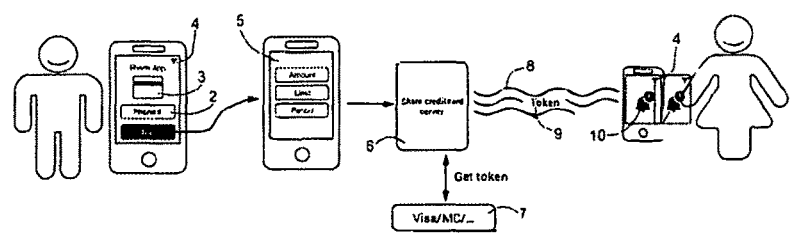
Figure 1:
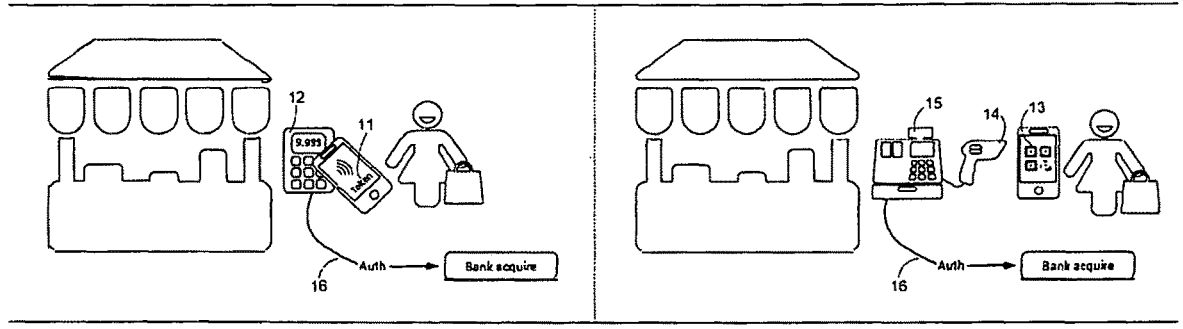
Figure 1:
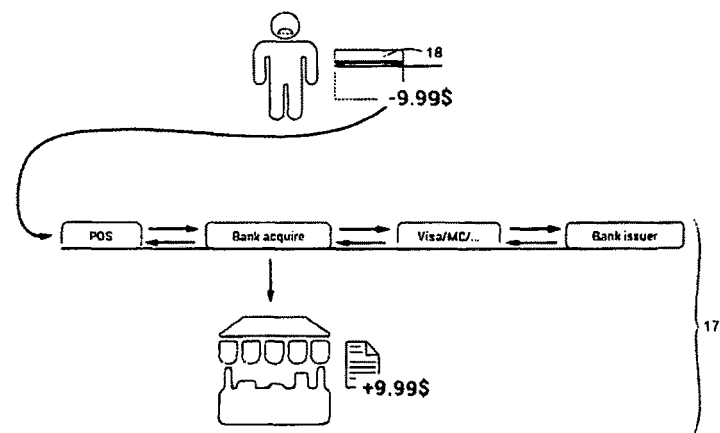

An automated digital method of providing or sharing access to a payment card and/or similar financial account, or non-payment card and/or similar non-financial account or non-card product enable a recipient to get access to a payment card and/or financial account, or non-payment card and/or similar non-financial account and/or non-card product without involvement of recipient payment card and/or financial account, or non-payment card and/or similar non-financial account or non-card product by using a digital token or any other applicable identifier to make transactions using NFC enabled device (optionally) or QR code or any other universal platform subject to conditions set by the sender (optionally), without transferring money between individual, corporate, business, etc. payment card and/or similar financial accounts (applicable for payment cards and/or similar financial accounts). The need for participation of third parties does not exist to settle transactions using access to a sender payment card and/or similar financial account, or non-payment card and/or similar non-financial account and/or non-card product, benefiting sender and/or recipient economically by avoiding additional resources, expenses (e.g., fees) and delays.

As understood herein, terms "sender" and "recipient" or "receiver" refer to individuals and/or legal entities who share, provide or receive (respectively) access to a payment card and/or similar financial account, non-payment card and/or similar non-payment account or non-card product; and/or devices embodied in electronic hardware with programmable software, such as computer, server, or other computational device having processing, storage, and user/network interface ability, such as portable/wireless/cell/smartphone, smartwatch or another network-accessible device, personal computer, laptop, etc.

Furthermore, as understood herein, term "payment card" is defined generally to include but is not limited to, credit, debit, other types of cards, individual, corporate, business, etc. payment cards, unique personal/business account, or other type of financial account. Term "non-payment card" is defined generally to include, but is not limited to, SIM cards, ID cards, gift cards, stored-value (e.g., pre-paid) cards, and other types of non-payment cards and/or similar non-financial accounts. Term "non-card product" is defined generally to include cars, vehicles, any type of tickets, coupons, vouchers, biometric data and other types of similar non-card products etc.

Furthermore, as understood herein, "applicable identifier" may be defined to include but is not limited to, card ID, electronic key (e-key), token, access code, biometric data for example, face ID, fingerprints, semantic and haptic data, environmental data, sensor generated data.

Sender may provide or share access to a payment card and/or similar financial account using network-accessible device (e.g., smartphone, tablet, smartwatch, laptop, etc.) with Near Field Communication (NFC) (optionally), Special Mobile Application (SMA) (optionally) or SMA web version instead (optionally); recipient device being configurable to receipt digital token of a sender's payment card and/or similar financial account, or any other applicable identifier of non-payment card and/or similar non-financial account or non-card product, or any applicable identifier, thereby enabling individual or legal entity with such recipient device to access sender's payment card and/or financial account, or non-payment card and/or similar non-financial account or non-card product, subject to conditions set by sender (optionally), by withdrawing money from Automated Teller Machine (ATM), or pay via Point Of Sale (POS) terminal, making e-commerce transactions, money transfers and/or fund disbursements (applicable for payment cards and/or similar financial account) and/or another type of transactions. It is contemplated herein, that sender may not need smartphone or another network-accessible device with NFC, since sender may share access without using NFC function thus, the sender may use SMA or web version instead (optionally). Recipient may not need smartphone or another network-accessible device (e.g., tablet, smartwatch, laptop, etc.) configured with NFC to use received access to payment card and/or financial account, or non-payment card and/or similar non-financial account or non-card product. If either recipient's or merchant's device does not support NFC technology, the recipient may use received access to payment card and/or financial account, or non-payment card and/or similar non-financial account or non-card product for any purpose using the QR code or any other universal platform.

Operationally in one representative embodiment, it is contemplated that sender using network-accessible device (e.g., smartphone, tablet, smartwatch, laptop, etc.) through Special Mobile Application (SMA) (optionally) determines one or more individuals or legal entities whom sender wants to provide with an access to a payment card and/or similar financial account, or non-payment card and/or similar non-financial account or non-card product by choosing a mobile phone number, email, account in online social media and/or social networking service (e.g., Facebook), International Mobile Equipment Identity (hereinafter—"EMEI"), a media access control address of a recipient's computer or other device which shall mean a unique identifier assigned to network interfaces for communications at the data link layer of a network segment (hereinafter—"MAC address"), another global ID, etc., sets conditions (optionally), e.g., an amount of funds to which sender may provide or share access, the type of permitted transaction and/or the deadline for access to a payment card and/or similar financial account, or non-payment card and/or similar non-financial account or non-card product for the recipient of such access. The recipient of the access to the sender's payment card and/or similar financial account, or non-payment card and/or similar non-financial account and/or non-card product receives an invitation to use access to the payment card and/or financial account or non-payment card and/or similar non-financial account or non-card product of the sender and upon its acceptance recipient may receive the digital token of the sender's payment card and/or financial account, or non-payment card and/or similar non-financial account or non-card product, or any applicable identifier for to the Special Mobile Applications (optionally) downloaded to the recipient's smartphone or another network-accessible device (e.g., tablet, smartwatch, laptop, etc.).

Digital method of providing or sharing access to a payment card and/or similar financial account is initially via a cloud based technology but, also can be deployed to private cloud, in-house, on-premises, and/or to other type of environment.

An automated digital method of providing or sharing access to payment cards may be used by (including but not limited to):

banks or financial institutions that have already integrated Visa Token Services (VTS), MasterCard Digital Enablement Service (MDES) or other similar service and receive digital tokens, banks or financial institutions that have not integrated VTS, MDES or other similar service yet and are not able to receive digital tokens, third-party wallet providers (such as Apple Pay, Google Wallet, Samsung pay, Android Pay etc), that receive digital token of payment card through integration with VTS, MDES and/or issuing bank and/or other similar service.

An automated digital method of providing or sharing access may be used in order to share access to either item, object or thing including but not limited to goods, products, vehicles, data, information in different areas including but not limited to educational industry, health industry, engineering, by sending any applicable identifier.

Now with reference to FIG. 1. FIG. 1 shows a conceptual scheme of digital method of providing or sharing access to a payment card and/or similar financial account.

A Conceptual Scheme of Digital Method of Providing or Sharing Access to a Payment Card and/or Similar Financial Account or Non-Payment Card and/or Similar Non-Financial Account or Non-Card Product is the Following:

In an embodiment of the present invention, step 1. a person (physical person or legal entity) who requires access to a payment card and/or similar financial account or non-payment card and/or similar non-financial account or non-card product of another person (physical person or legal entity) may inform such person via any accessible method.

Alternatively, Step 1 may be optional and may be skipped if sharing of an access to a payment card and/or similar financial account or non-payment card and/or similar non-financial account and/or non-card product is initiated by a sender (not recipient).

Optionally, sender's and/or recipient's device 1 may be a portable/wireless/cell/smartphone, smartwatch or another network-accessible device, personal computer, laptop, etc.

Further yet, in step 2, a person (physical person or legal entity) who wants to share access to a payment card and/or similar financial account or non-payment card and/or similar non-financial account and/or non-card product may have a SMA (optionally), may choose a payment card and/or similar financial account or non-payment card and/or similar non-financial account and/or non-card product access to which will be shared 3 (optionally), may choose recipient 2, may set up limits 5 (optionally), and may send request for sharing of access to a payment card and/or similar financial account or non-payment card and/or similar non-financial account and/or non-card product (function of sharing of access to a payment card and/or similar financial account by receiving of a digital token by recipient device may be fulfilled by a payment system, bank or financial institution, expert system, etc.—depending of a way of embodiment of the invention). Such request may be sent from at least one device, but not limited to, (e.g., smartphone, tablet, smartwatch, laptop, etc.) via any available instrument (e.g., mobile application, web-site, sms, notification etc.).

Sender may choose recipient of the shared or provided access to either a payment card and/or similar financial account or a non-payment card and/or similar non-financial account and/or non-card product by choosing at least one of, but not limited to, a phone number, email, account in online social media and/or social networking service (e.g., Facebook), EMEI, MAC address, etc., or other global ID 2 of the recipient.

Sender may share or provide recipient with an access to either a payment card and/or similar financial account or a non-payment card and/or similar non-financial account and/or non-card product 3.

Further yet, in an embodiment of the invention, sender and recipient may have network access 4 via at least one of, but not limited to, wifi, cellular, bluetooth, and, or another type of connection to share access to a payment card and/or similar financial account to the recipient or a non-payment card and/or similar non-financial account and/or non-card product.

Optionally, sender can specify (i) an amount 5 within which the recipient may perform operations using shared access to a payment card and/or similar financial account, (ii) a limited amount for withdrawing money 5 from Automated Teller Machine (ATM), payments via Point Of Sale (POS) terminal, making e-commerce transactions, money transfers, fund disbursements and/or another type of transactions. The sender may also specify a time period 5 for which a shared access to a payment card and/or similar financial account or a non-payment card and/or similar non-financial account and/or non-card product will be available to the recipient.

The management and processing of requests for the sharing access to a payment and/or similar financial account or a non-payment card and/or similar non-financial account and/or non-card product, limit verification (optionally), receipt of a digital token or any other applicable identifier of payment card and/or similar payment card account and/or non-payment card and/or similar non-payment card account and/or non-card product occurs in Corezoid cloud process engine or any other relevant software enabling management of the sharing process (hereinafter—"Share.CreditCard server" 6) which interacts with VTS/MDES and/or a issuing bank, card issuer and/or other similar service.

When sender selects a payment card and/or similar financial account, sets up limits (optionally), and selects recipient, request for digitalization of the payment card and/or similar financial account (namely request and receipt of the digital token of the sender's payment card) shall take a place.

For non-payment card and/or similar non-financial account and/or non-card product digital token or any applicable identifier is not required to be obtained via Visa Token Services (VTS), MasterCard Digital Enablement Service (MDES) or other similar service.

Also, if issuing bank has already integrated Visa Token Services (VTS), MasterCard Digital Enablement Service (MDES) or other similar service, the process of receiving of the digital token of the payment card and/or similar financial account may be obtained by interacting with the bank's service and the bank, in its turn, receives the digital token from Visa Token Services (VTS), MasterCard Digital Enablement Service (MDES) or other similar service by the standard procedure of the digital token provisioning. When an issuing bank has not integrated Visa Token Services (VTS), MasterCard Digital Enablement Service (MDES) or other similar service yet, then the process of receiving of the digital token of the payment card and/or similar financial account may be obtained by interaction with Visa Token Services (VTS), MasterCard Digital Enablement Service (MDES) or other similar service. In case of third-party wallet provider (such as Apple Pay, Google Wallet, Samsung pay, Android Pay etc), which receives digital token of a payment card and/or similar financial account through integration with Visa Token Service (VTS), MasterCard Digital Enablement Service (MDES) and/or issuing bank and/or other similar service the process of receiving of the digital token of the payment card and/or similar financial account may be obtained by interacting with third-party wallet provider and receiving digital token from third-party wallet provider 7.

Then, received digital token shall be sent to the recipient's device with SMA (optionally), thus, the access to the payment card and/or similar financial account of the sender is shared with the recipient 8. The received digital token or any applicable identifier of non-payment card and/or similar non-financial account and/or non-card product shall be sent to the recipient's device with SMA (optionally) thus, the access to the non-payment card and/or similar non-financial account and/or non-card product of the sender is shared with the recipient.

Digital token of a payment card and/or similar financial account received via VTS/MDES may be used to transact using NFC enabled device or using QR code or any other universal platform. Non-payment cards and/or non-card products may be shared by the same conceptual scheme, but digital tokens may be replaced with any other available instrument 9 (e.g., identifier).

After digital token of payment card and/or similar financial account, or non-payment card and/or similar non-financial account and/or non-card product is sent to recipient's device with SMA, the recipient receives notification to SMA (optionally). If the recipient does not have a SMA recipient may receive notification via at least one of, sms, email 10, etc.

Further yet, in an embodiment of the invention, step 3, once the sharing process is complete, the digital token of payment card and/or similar financial account, or any other applicable identifier of non-payment card and/or similar non-financial account and/or non-card product may be saved on a recipient's network-accessible device 11, who may use such access for any applicable purpose (including, but not limited to, withdrawing money from ATM, making payments via POS terminal, making e-commerce transactions, money transfers, fund disbursements and/or another type of transactions 12, 14, 15, etc.). If either recipient's or merchant's device does not support NFC technology, the recipient may make transactions using QR code 13, 14, 15.

In a continuing reference to FIG. 1, step 4, for payment cards and/or similar financial account, a transaction of debiting fund from the payment card and/or similar financial account of sender (access to which has been shared) shall take place, when the recipient makes withdrawal of money from ATM, payment via POS terminal, makes e-commerce transactions, money transfers, fund disbursements and/or another type of transactions 18.

For payment cards and/or similar financial account, a flow of authorization and debiting funds shall take place using a standard scheme—via bank-acquirer, payment system, and issuing bank of the payment card access to which has been shared with the recipient 16, 17.

Throughout the process described above, access to the sender's payment card and/or similar financial account or non-payment card and/or similar non-financial account and/or non-card product can be canceled by the sender.

Optionally, access to the payment card and/or similar financial account, received by the recipient may also be shared by the recipient with any third party via the SMA (optionally) if, such transaction is not prohibited by the sender of the shared access. The share of shared access with any third party by the recipient occurs in accordance with the instructions given for sharing an access to a payment card and/or similar financial account.

The above described digital method and system of providing or sharing access to a payment card and/or similar financial account or non-payment card and/or similar non-financial account and/or non-card product may be automated as suggested below:

selection of the recipient to the sender's payment card, and/or similar financial account or non-payment card and/or similar non-financial account and/or non-card product; and/or selection of a global ID of the recipient; and/or selection of the payment card and/or similar financial account or non-payment card and/or similar non-financial account and/or non-card product; and/or setting of the limits for using shared access by the recipient.

Figure 2:
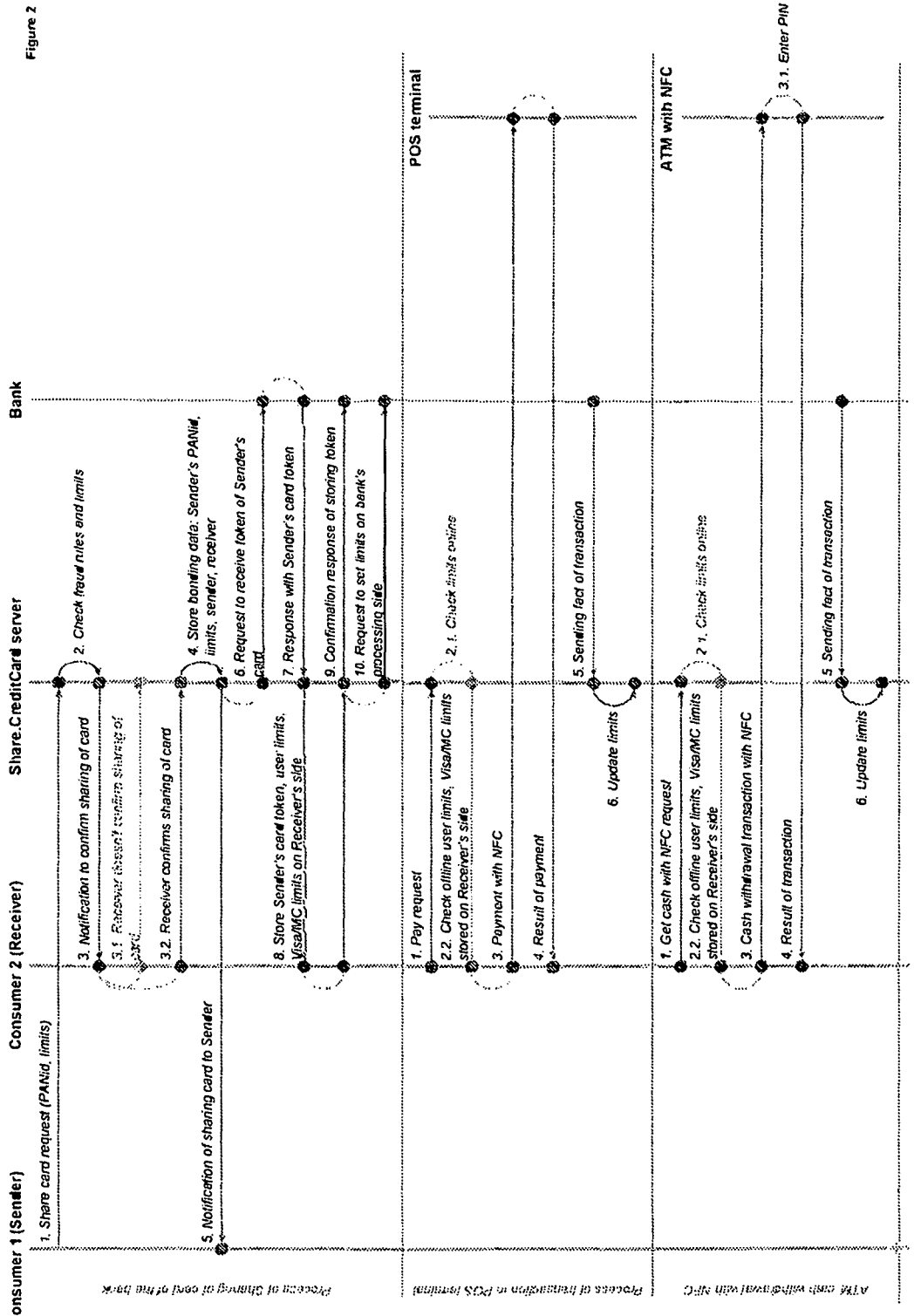
FIG. 2 illustrates representative method embodiment diagram including general share process that may be implemented by banks or financial institutions that have already integrated VTS, MDES or other similar service and receive digital tokens of payment cards and/or similar financial accounts.

FIG. 2 shows representative method embodiment diagram for according to one or more aspect of the present invention, including general share process that may be implemented by banks or financial institutions that have already integrated VTS, MDES or other similar service and get digital tokens of payment cards and/or similar financial accounts.

FIG. 3 shows representative method embodiment diagram for according to one or more aspect of the present invention, including general share process that may be implemented by banks or financial institutions that have not integrated VTS, MDES or other similar service yet and are not able to get digital tokens of payment cards and/or similar financial accounts.

FIG. 4 shows representative method embodiment diagram for according to one or more aspect of the present invention, including general share process that may be implemented by third-party wallet providers (such as Apple Pay, Google Wallet, Samsung pay, Android Pay etc.), that receive digital token of payment card through integration with VTS, MDES and/or issuing bank and/or other similar service.

Continuing with reference to FIGS. 2, 3 and 4, in one embodiment, in order to share an access to a payment card and/or similar financial account using current existing token services such as Visa Token Services (VTS), MasterCard Digital Enablement Service (MDES) (however, payment card sharing process may be implemented using any other services related to the provision of digital tokens to a payment card and/or similar financial account):

Step 1.

A holder of a payment card and/or similar financial account (sender) downloads a Special Mobile Application (optionally) or uses SMA web version instead (optionally).

In the Special Mobile Application (optionally) of the sender, optionally Sender software or any other messenger or software (hereinafter—"Sender software" or "Sender") may be integrated in order to provide notifications to the sender and to the recipient in the process of sharing access to a payment or non-payment card and/or similar financial account and/or non-card product, as well as end-to-end integration with Share.CreditCard server as shown in FIGS. 2,3 and 4—Share.CreditCard server.

Usage of SMA within the process of sharing or providing access to a payment card and/or similar financial account is optional, especially for third-party wallet providers (such as Apple Pay, Google Wallet, Android Pay, Samsung pay etc), that receive digital token of payment card and/or similar financial account through integration with VTS, MDES and/or issuing bank and/or other similar service.

Step 2.

Sender through the card management system (e.g., issuer wallet or other similar wallets) in the Special Mobile Application (optionally) adds the information about the payment card and/or similar financial account, access to which will be shared with another individual or legal entity. If the payment card and/or similar financial account has already been added to the Special Mobile Application (optionally), sender selects the payment card and/or similar financial account, access to which will be shared with another individual or legal entity.

Step 3.

Sender in the Special Mobile Application (optionally) sets the following limits for the shared access to the payment card and/or similar financial account:

the amount of funds to which access may be shared together with the access to payment card and/or similar financial account (sender can set a certain amount to which access may be shared or give access to the entire amount of available funds on the payment card and/or similar financial account);

the type of use of payment card and/or similar financial account, access to which may be shared (sender can set the following types of use of the amounts of funds to which access may be shared: withdrawal of money from ATM, payment via POS terminal, e-commerce transactions, money transfers, fund disbursements and/or another type of transactions);

the number of transactions (sender can set the number of transactions; which recipient will be authorized to make using shared access to the sender's payment card and/or similar financial account);

the term of the access to the payment card (sender can set the period of access to the payment card and/or similar financial account or to share access to the payment card and/or similar financial account on a regular basis).

Mentioned above settings and limits are optional. If sender does not set either of the mentioned limits, such limits may be set by default. Sender may set no limits; and no limits may be set by default.

Step 4.

Sender of the access to the payment card and/or similar financial account chooses/specifies the recipient (an individual or legal entity who will be granted the access to the payment card of the sender) by entering the cell phone number (email, account in online social media and/or social networking service (e.g., Facebook), EMEI, MAC address, or any other global ID) of the recipient of the shared access to the payment card and/or similar financial account.

The cell phone number, email, account in online social media and/or social networking service (e.g., Facebook), EMEI, MAC address, or any other global ID) may be a special identifier of the recipient of the shared access to the sender's payment card and/or similar financial account. Optionally, the choice of the recipient depends on the capabilities of the SMA where the cell phone number, email, account in online social media and/or social networking service (e.g., Facebook), EMEI, MAC address, or any other global ID is not necessarily used.

Usage of SMA within the process of sharing or providing access to a payment card and/or similar financial account is optional, especially for third-party wallet providers (such as Apple Pay, Google Wallet, Android Pay, Samsung pay etc), that receive digital token of payment card and/or similar financial account through integration with VTS, MDES and/or issuing bank and/or other similar service.

Step 5.

Following the initiation of sharing the access to the sender's payment card and/or similar financial account, information regarding such request of sharing of an access to a payment card and/or similar financial account is transferred from Sender software integrated to SMA of the sender (optionally) to Share.CreditCard server.

Step 6.

The information regarding sharing access is transmitted to the cloud expert system e.g., Deepmemo, Deepmemo system, or other relevant cloud expert system (hereinafter—"Deepmemo") in order to control fraud and/or limits as shown in FIGS. 2,3 and 4-2. Check fraud rules and limits.

Integration with Deepmemo is optional, also Deepmemo may be replaced with another applicable software.

Step 7.

Further yet, in an embodiment of the invention, successful passing of fraud and limits, Deepmemo system confirms possibility of access sharing and sends response with corresponding information to the Share.CreditCard server.

Step 8.

Share.CreditCard server sends to SMA of the recipient with the integrated Sender software (optionally) notification of the shared access to the payment card and/or similar financial account.

If the recipient of the access to the payment card and/or similar financial account has not installed the SMA yet, such recipient of the access to the sender's payment card and/or similar financial account may receive an SMS or email with invitation to download and install the SMA as referenced in FIGS. 2,3, and 4-3. Notification to confirm sharing of card.

Step 9.

Upon notification receipt, the recipient may confirm or deny the shared access to the payment card and/or similar financial account (optionally) as seen in FIGS. 2,3, and 4-3.2. Receiver confirms sharing of card and 3.1. Receiver doesn't confirm sharing of card.

Step 10.

Upon the confirmation from the recipient of the shared access to the sender's payment card and/or similar financial account, notification is sent from Sender software integrated into the recipient's SMA (optionally) to Share.CreditCard server.

The identifier of the sender's shared payment card and/or similar financial account and limits (optionally) are sent in a request from the Share.CreditCard server to Deepmemo.

The sender receives a confirmation of acceptance of the shared access to the payment card and/or similar financial account by the recipient in SMA (optionally).

For sharing the access to payment cards and/or similar financial account that may be implemented by banks or financial institutions that have not integrated VTS, MDES or other similar service yet and are not able to get digital tokens—the initiation of the provisioning process of the digital token of the sender's payment card and/or similar financial account occurs in Share.CreditCard server as seen in FIGS. 3-6. Init device request-generate cert key. Request of enroll PAN takes place, namely when Share.CreditCard server transmits information of the sender's payment card and/or similar financial account to VTS/MDES or other similar services. After this, request for token provision takes place, namely when the digital token of sender's payment card and/or similar financial account is transmitted to VTS/MDES or other similar services for the confirmation (FIG. 3-8.2. Provision Token).

Step 11.

Upon receipt of the digital token of the sender payment card and/or similar financial account, information about such digital token of the sender payment card and/or similar financial account and limits (optionally) is transmitted to the SMA, as seen in FIGS. 2,3 and 4—Store Sender's card token, user limits, Visa/MC limits on Receiver's side.

Step 12.

After saving the information about the digital token and limits (optionally), confirmation of receipt of the provided digital token (FIGS. 2, 4-9. Confirmation response of storing token, on FIGS. 3-9. Confirm token provisioning) is transferred from Share.CreditCard server to:

the bank's service (for banks or financial institutions that have integrated VTS, MDES or other similar service and are able to get digital tokens);

the payment system (for banks or financial institutions that have not integrated VTS, MDES or other similar service yet and are not able to get digital tokens);

the third-party wallet providers' service (such as Apple Pay, Google Wallet, Android Pay, Samsung pay etc), that receive digital token of payment card through integration with VTS, MDES and/or issuing bank and/or other similar service.

The access to the payment card and/or similar financial account becomes available to the recipient.

Further yet, in another embodiment of the invention, information about the limits from the Share.CreditCard server may be transferred to processing center of the bank (e.g., bank's processing host, etc.) (FIGS. 2 and 3-10. Request to set limits on the bank's processing side).

Optionally, in one embodiment of the invention, the recipient will be able to validate or decline access to the sender's payment card and/or similar financial account (FIGS. 2,3, and 4-3.2. Receiver confirms sharing of card and 3.1. Receiver doesn't confirm sharing of card).

Optionally, in one embodiment of the invention, the process of sharing an access to payment card and/or similar financial account may begin from obtaining a digital token from another source for example, if the digital token has been issued in advance and has been transmitted to Deepmemo (optionally) from another source, etc.

Either of the above mentioned steps may be omitted, if there is any alternative place of data, digital token or information receipt. The process of sharing of an access to payment card and/or similar financial account may start from either of the mentioned steps if all required previous steps have been passed by another process, method, system, software etc.

Throughout the process described above, access to the sender's payment card and/or similar financial account can be canceled by the sender.

The process of sharing of an access to payment card and/or similar financial account may be used with any other services related to the provision of digital tokens to a payment card and/or similar financial account.

Continuing with reference to FIGS. 2, 3 and 4, in one embodiment, in order to get shared access to a payment card and/or similar financial account via Special Mobile Application:

Step 1.

After the sender shares access to a payment card and/or similar financial account, the recipient of such access receives at least one of, a SMS, message in any messenger, email, push-notification in SMA (if such recipient has already installed it), etc. with information about the shared access to the payment card and/or similar financial account (optionally).

Step 1a (Optional).

If the recipient of the access has already installed the SMA, such recipient of the access to the payment card and/or similar financial account may receive an invitation to confirm receiving of an access to the sender's payment card and/or similar financial account in the SMA.

Step 2.

If the recipient confirms receiving of an access to the sender's payment card and/or similar financial account (FIGS. 2,3, and 4-3.2. Receiver confirms sharing of card), a confirmation is sent from Sender software integrated into the recipient's SMA to Share.CreditCard server.

Optionally, if the recipient refuses the acceptance of the access to the sender's payment card, and/or similar financial account, the sender will receive a notification of recipient's refusal to accept the access to the payment card and/or similar financial account of the sender. Optionally, if the recipient of the access does not accept the shared access to the sender's payment card and/or similar financial account within specific number of hours, providing of the access to the sender's payment card and/or similar financial account for such recipient will be automatically canceled.

Optionally, in one embodiment of the invention, the recipient will be able to validate or decline access to the sender's payment card and/or similar financial account (FIGS. 2,3, and 4-3.2. Receiver confirms sharing of card and 3.1. Receiver doesn't confirm sharing of card).

Step 3.

Optionally, the identifier of the sender's shared payment card and/or similar financial account and limits (optionally) are sent from the Share.CreditCard server to Deepmemo (optionally) (FIGS. 2,3, and 4-4. Store bonding data: Sender's PANid, limits, sender, receiver).

Optionally, the sender may receive a confirmation of acceptance of the shared access to the payment card and/or similar financial account by the recipient via SMA (FIGS. 2,3, and 4-5. Notification of sharing card to Sender).

Step 4.

Next step is a request to tokenize sender's payment card and/or similar financial account.

The request is transferred from Share.CreditCard server to the payment system (such as Visa, MasterCard, American Express, etc.). The request to tokenize sender's payment card and/or similar financial account may optionally include several requests, such as Enroll Device (FIGS. 3-7. Enroll device request), Enroll Pan (FIGS. 3-8.1. Enroll PAN), Provision token (FIGS. 3-8.2. Provision Token).

With Regard to Third-Party Wallet Providers (Such as Apple Pay, Google Wallet, Samsung Pay, Android Pay Etc), that Receive Digital Token of Payment Card Through Integration with VTS, MDES and/or Issuing Bank and/or Other Similar Service:

Since a third-party wallet provider itself may perform (optionally) enroll pan and digital token provisioning operations to obtain the digital token of the sender's payment card and/or similar financial account, Share.CreditCard server may send the request to the service of such third-party wallet provider to get the token of the sender's payment card and/or similar financial account (FIGS. 4-6. Request to pass token of Sender's card).

With Regard to Banks or Financial Institutions that have Already Integrated Visa Token Services (VTS), MasterCard Digital Enablement Service (MDES) or Other Similar Service and Get Digital Tokens:

Since such bank or financial institution itself may perform (optionally) the enroll pan and digital token provision operations to obtain the digital token of the sender's payment card and/or similar financial account, Share.CreditCard server may send the request to the service of such bank or financial institution to get the token of the sender's payment card and/or similar financial account (FIGS. 2-6. Request to receive token of Sender's card).

Step 5.

Upon provisioning of token of sender's payment card and/or similar financial account, the information about the digital token of the sender's payment card as well as limits (optionally) (FIGS. 2 and 4-8. Store Sender's card token, user limits, Visa/MC limits on Receiver's side, FIGS. 3-8.3. Store Sender's card token, user limits, Visa/MC limits on Receiver's side) is transferred to the recipient via SMA.

Step 6.

After storing the information about the digital token and limits, acknowledgment of receipt of the provided digital token (FIGS. 2 and 4-9. Confirmation response of storing token, FIGS. 3-9. Confirm token provisioning) is transmitted from Share.CreditCard server to:

the service of third-party wallet providers (with regard to third-party wallet providers (such as Apple Pay, Google Wallet, Samsung pay, Android Pay, etc), that may receive digital token of payment card and/or similar financial account through integration with VTS, MDES and/or issuing bank and/or other similar service);

the bank/financial institution service (with regard to banks or financial institutions that have already integrated VTS, MDES or other similar service and may get digital tokens). Further, information about the limits from Share.CreditCard server to processing the bank (FIGS. 2-10. Request to set limits on the bank's processing side) is transferred (optionally);

the bank/financial institution service (with regard to banks or financial institutions that have not integrated VTS, MDES or other similar service yet and are not able to get digital tokens). Further, information about the limits from Share.CreditCard server to processing of the bank (FIGS. 3-10. Request to set limits on the bank's processing side) is transferred (optionally).

Step 7.

Upon storing digital token on recipient device in SMA and confirmation of digital token provisioning, the recipient receives access to sender's payment card and/or similar financial account.

Throughout the process described above, access to the sender's payment card and/or similar financial account can be canceled by the sender.

Optionally, access to the payment card and/or similar financial account, received by the recipient may also be shared by the recipient with any third party via the SMA (optionally) if such transaction is not prohibited by the sender of the shared access. The share of shared access with any third party by the recipient occurs in accordance with the instructions given for sharing an access to a payment card and/or similar financial account.

Continuing with reference to FIGS. 2, 3 and 4, in one embodiment, in order to send request for getting shared access to a payment card and/or similar financial account or non-payment card and/or similar non-financial account and/or non-card product:

Step 1.

The recipient of the access to the sender's payment card and/or similar financial account or non-payment card and/or similar non-financial account and/or non-card product installs SMA (optionally) on a device with Near Field Communication (NFC) function (optionally) if such SMA (optionally) has not been installed by recipient yet.

Step 2.

The recipient of the access to the payment card and/or similar financial account or non-payment card and/or similar non-financial account and/or non-card product sends a special request to the sender for getting access to such sender's payment card and/or similar financial account or non-payment card and/or similar non-financial account and/or non-card product through the SMA (optionally).

Step 3.

The sender of the access to payment card and/or similar financial account or non-payment card and/or similar non-financial account and/or non-card product receives a request from the recipient of the access for getting the access to payment card and/or similar financial account or non-payment card and/or similar non-financial account and/or non-card product in the SMA (optionally).

Step 4.

If the sender of the access to payment card and/or similar financial account or non-payment card and/or similar non-financial account and/or non-card product agrees to provide access to a payment card and/or similar financial account or non-payment card and/or similar non-financial account and/or non-card product to the recipient, such sender may act according to the instructions given for sharing an access to a payment card and/or similar financial account or non-payment card and/or similar non-financial account and/or non-card product.

Step 4a (Optional).

If the sender of the access to the payment card and/or similar financial account or non-payment card and/or similar non-financial account and/or non-card product does not agree to provide access to a payment card and/or similar financial account or non-payment card and/or similar non-financial account and/or non-card product to the recipient, such sender may reject the transaction in the SMA (optionally). In this case, the recipient of the access to the payment card and/or similar financial account or non-payment card and/or similar non-financial account and/or non-card product receives a notification that request of the access to the payment card and/or similar financial account or non-payment card and/or similar non-financial account and/or non-card product has been denied by the sender in the SMA (optionally).

Throughout the process described above, access to the sender's payment card and/or similar financial account can be canceled by the sender.

Optionally, access to the payment card and/or similar financial account, received by the recipient may also be shared by the recipient with any third party via the SMA (optionally) if such transaction is not prohibited by the sender of the shared access. The share of shared access with any third party by the recipient occurs in accordance with the instructions given for sharing an access to a payment card and/or similar financial account.

Continuing with reference to FIGS. 2, 3 and 4, in one embodiment, in order to use shared access to the payment card and/or similar financial account for making payments in POS terminal:

Step 1.

After receiving of the access to the payment card and/or similar financial account, the recipient may optionally select a payment menu in the SMA (optionally).

Step 2.

After selecting payment menu in the SMA, the recipient may optionally select shared card and/or similar financial account to which access is provided by the sender. Then recipient may optionally bring a smartphone or another network-accessible device (such as smartphone, tablet, smartwatch, laptop, etc.) to a NFC enabled POS terminal (optionally). The NFC enabled POS terminal (optionally) reads the digital token of the sender's payment card and/or similar financial account, and receives payment data through NFC channel of data transmission. If either recipient's or merchant's device does not support NFC technology, the recipient may make transactions using QR code or any other universal platform.

Optionally, limits may be checked in SMA (optionally) installed on recipient's device, in Deepmemo (optionally), on the side of processing center of card issuing bank.

Step 3.

After successful or unsuccessful transaction, POS terminal may display information of the transaction. In case of successful transaction, funds are debited from the sender's payment card and/or similar financial account. For payment cards and/or similar financial account, a flow of authorization and debiting funds shall take place using a standard scheme—via bank-acquirer, payment system, and issuing bank of the payment card and/or similar financial account access to which has been shared with the recipient.

Optionally, after a successful transaction, the card issuing bank may send information about the transaction to Share.CreditCard server which further transfers information to Deepmemo for synchronization of limits.

Optionally, in order to use shared access to the payment card and/or similar financial account for making payments, recipient may need to select respective payment type once; then, recipient may need to unlock smartphone or another network-accessible device (such as smartphone, tablet, smartwatch, laptop, etc.), and to bring smartphone or another network-accessible device to NFC enabled POS terminal (optionally); then, proximity payment (e.g., MasterCard Paypass/Visa paywave transaction using Visa Token Service, in case of Visa and/or MasterCard Cloud based payment, in case of MasterCard, etc.) technology. If either recipient's or merchant's device does not support NFC technology, the recipient may make transactions using QR code or any other universal platform.

Continuing with reference to FIGS. 2, 3 and 4, in one embodiment, in order to use shared access to the payment card and/or similar financial account for cash withdrawal through ATM:

Step 1.

After receiving of the access to the payment card and/or similar financial account, the recipient may select a cash withdrawal menu in the SMA (optionally).

Step 2.

After selecting the cash withdrawal menu in the SMA (optionally), the recipient brings a network-accessible device to NFC enabled ATM. The NFC enabled ATM (optionally) reads the token of the sender's payment card and/or similar financial account through NFC channel of data transmission. If either recipient's device or ATM does not support NFC technology, the recipient may make cash withdrawal using QR code or any other universal platform.

Optionally, limits may be checked in SMA (optionally) installed on recipient's device, in Deepmemo (optionally), on the side of processing center of card issuing bank.

Optionally, after a successful transaction, the card issuing bank may send information about the transaction to Share.CreditCard server which further transfers information to Deepmemo for synchronization of limits.

Step 3.

The funds are received by recipient via the NFC enabled ATM (optionally). Funds are debited from the sender's payment card and/or similar financial account. For payment cards and/or similar financial account, a flow of authorization and debiting funds shall take place using a standard scheme—via bank-acquirer, payment system, and issuing bank of the payment card and/or similar financial account access to which has been shared with the recipient.

Optionally, after a successful transaction, the card issuing bank may send information about the transaction to Share.CreditCard server which further transfers information to Deepmemo for synchronization of limits.

Optionally, in order to use shared access to the payment card and/or similar financial account for cash withdrawal through ATM, recipient may need to select respective payment type once; then, recipient may need to unlock smartphone or another network-accessible device (such as smartphone, tablet, smartwatch, laptop, etc.), and bring network-accessible device to NFC enabled ATM (optionally), and may need to enter PIN of sender payment card and/or similar financial account; then, Proximity Payment (e.g., MasterCard Paypass/Visa paywave transaction using Visa Token Service, in case of Visa and/or MasterCard Cloud based payment, in case of MasterCard) technology. If either recipient's or merchant's device does not support NFC technology, the recipient may make transactions using QR code or any other universal platform.

Now with reference to FIG. 5. FIG. 5 shows representative method embodiment diagram for according to one or more aspect of the present invention, including general process of providing or sharing access to non-payment cards and/or similar non-financial accounts and/or non-card product.

In an embodiment of the present invention, step 1, a person (physical person or legal entity) who requires access to a non-payment card and/or similar non-financial account and/or non-card product of another person (physical person or legal entity) may inform such a person via any accessible method.

Additionally, step 1 may be omitted if sharing of an access to a non-payment card and/or similar non-financial account and/or non-card product is initiated by a sender (not recipient).

Optionally, sender's and/or recipient's device may be at least one of, but not limited to, a portable/wireless/cell/smartphone, smartwatch or another network-accessible device, personal computer, laptop, etc.

Further yet, in step 2, a person (physical person or legal entity) who wants to share access to a non-payment card and/or similar non-financial account and/or non-card product may have a SMA (optionally), may choose a non-payment card and/or similar non-financial account and/or non-card product access to which will be shared (optionally). Further yet in an embodiment of the invention, a person may choose the recipient, may set up limits (optionally), and may send request for sharing of access to a non-payment card and/or similar non-financial account and/or non-card product (function of sharing of access to a non-payment card and/or similar non-financial account and/or non-card product by receiving of any applicable non-payment card and/or similar non-financial account and/or non-card product digital token or any applicable identifier by recipient device may be fulfilled by a card issuer, etc.—depending of a way of embodiment of the invention). Such request may be sent from any device, including but not limited to smartphone, tablet, smartwatch, laptop, etc. via any available instrument (e.g., mobile application, web-site, sms, notification etc.) (FIGS. 5-1. Share non-payment card request (cardId)).

Sender may choose the recipient of the shared or provide access to a non-payment card and/or similar non-financial account and/or non-card product by entering at least one of, but not limited to, choosing a phone number, email, account in various online social media and/or social networking services (e.g., Facebook), EMEI, MAC address, etc., or other global ID of the recipient.

Sender may share or provide recipient with an access to a non-payment card and/or similar non-financial account and/or non-card product.

Further yet, in an embodiment of the invention, sender and recipient may have network access via at least one of, but not limited to, wifi, or cellular, bluetooth and, or any other connection to share access to a non-payment card and/or similar non-financial account and/or non-card product.

Optionally, sender may specify any limits for recipient's using of a provided access such as, a time period for which a shared access to a non-payment card and/or similar non-financial account and/or non-card product will be available to the recipient.

The process, management and the processing of requests for sharing access to the non-payment card and/or similar non-financial account and/or non-card product, limit verification (optionally), receipt of digital token or any applicable identifier of non-payment card and/or similar non-payment card account and/or non-card product digital token or any applicable identifier occurs in Share.CreditCard server which a card issuer and/or other similar service.

Optionally the information regarding sharing access may be transmitted to the cloud expert system e.g., Deepmemo, Deepmemo system, or other relevant cloud expert system in order to control fraud and/or limits as shown in (FIGS. 5-2. Check fraud rules and limits).

For the non-payment card and/or similar non-financial account and/or non-card product digital token or any applicable identifier is not required to be obtained via Visa Token Services (VTS), MasterCard Digital Enablement Service (MDES) or other similar service.

The received digital token or any applicable identifier of the non-payment card and/or similar non-financial account and/or non-card product may be sent to the recipient's device with SMA (optionally), thus, the access to the non-payment card and/or similar non-financial account and/or non-card product of the sender is shared with the recipient.

After digital token or any applicable identifier of non-payment card and/or similar non-financial account and/or non-card product is sent to recipient's device with SMA, the recipient receives notification to SMA (optionally). If the recipient does not have a SMA, the recipient may receive notification via at least one of, in sms, email, etc. (FIGS. 5-3. Notification to confirm sharing of non-payment card.)

Upon notification receipt, the recipient may confirm or deny the shared access to the non-payment card and/or similar non-financial account and/or non-card product (optionally) (FIGS. 5-3.1. Receiver doesn't confirm sharing of non-payment card or 3.2. Receiver confirms sharing of non-payment card.)

Upon receipt of digital token or any applicable identifier of the non-payment card and/or similar non-financial account and/or non-card product, information about such digital token or applicable identifier of the sender's non-payment card and/or similar non-financial account and/or non-card product and limits (optionally) is transmitted to the SMA (FIGS. 5-4. Store bonding data: Sender's cardId, sender, receiver.)

Further yet, in an embodiment of the invention, step 3, once the sharing process is complete, the digital token or applicable identifier of non-payment card and/or similar non-financial account and/or non-card product may be saved on a recipient's network-accessible device for any applicable purpose (FIGS. 5-5. Notification of sharing non-payment card to Sender.)

Throughout the process described above, access to the sender's non-payment card and/or similar non-financial account and/or non-card product may be canceled by the sender.

Optionally, access to the non-payment card and/or similar non-financial account and/or non-card product, received by the recipient may also be shared by the recipient with any third party via the SMA (optionally) if, such transaction is not prohibited by the sender of the shared access.

Foregoing descriptions of specific embodiments of the invention have been presented for purposes of illustration and description. They are not intended to be exhaustive or to limit the invention to the precise forms disclosed. Modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A computer-implemented method comprising:
   providing a tokenization service on an intermediary server;
   selecting, by the intermediary server, an account tokenized by the tokenization service for which sharing privileges are to be offered;
   defining, by the intermediary server, constraints upon the sharing privileges to the account, the constraints comprising at least one of the following:
   an identification of at least one recipient to receive the sharing privileges,
   a time for enabling and disabling the sharing privileges,
   an amount of asset value within the account to be conveyed with the sharing privileges,
   a quantity of transactions to be permitted with the account,
   at least one vendor approved for transaction with the account, and
   at least one type of transaction available for the sharing privileges;
   sending, from the intermediary server, a request for a digital token for the account, wherein sending the request for the digital token comprises sending the request to at least one of the following:
   a financial institution associated with the account, wherein the intermediary server operates independently of the financial institution,
   a digital tokenization service provider associated with the financial institution associated with the account, wherein the intermediary server operates independently of the digital tokenization service provider, and
   a digital wallet associated with the account;
   receiving, at the intermediary server, the digital token for the account;
   providing access to the digital token to a network-accessible device associated with a recipient of shared access privileges through a controlled interface, the controlled interface providing at least one of the following:
   an encryption of the digital token as a virtual identifier, and
   a communication means for interacting with at least one of the following:
   a physical POS terminal,
   an e-commerce terminal, and
   an ATM;
   receiving, at the intermediary server and from the network-accessible device associated with the recipient, a request to utilize the digital token through the controlled interface for performing a transaction, wherein receiving the request comprises receiving transaction details associated with the request;
   verifying, by the intermediary server, whether the transaction details are within the constraints established for the account; and
   responsive to determining that the transaction details are within the constraints:
   applying the digital token to perform the transaction, wherein the applying the digital token comprises:
   selecting, by a receiver via the controlled interface, the shared account,
   receiving, from the receiver via the controlled interface, a request to perform the transaction using the shared account,
   using the controlled interface to make the virtual identifier comprising the encrypted digital token available to a third party for use in completing the transaction, and
   causing a transfer of asset value from the shared account to facilitate the transaction in response to the application of the digital token.

2. The method of claim 1, wherein selecting the account for which sharing privileges are to be offered comprises:
   receiving, at the intermediary server and from a network-accessible device associated with an account holder of the account, an offer for the sharing privileges;

transmitting, by the intermediary server, a notification of the offer for sharing privileges to the network-accessible device associated with the recipient; and receiving, at the intermediary server and from the network-accessible device associated with the recipient, an acceptance of the sharing privileges for the recipient.

3. The method of claim 1, wherein sending the request for the digital token to the financial institution associated with the account comprises communicating with a preferred token service provider affiliated with the financial institution.

4. The method of claim 1, wherein the communication means for interacting with the POS terminal comprises a near field communication protocol.

5. The method of claim 1, wherein the communication means for interacting with the POS terminal comprises utilization of a QR code.

6. The method of claim 1, wherein the intermediary server is integrated into at least one of the following:
   the financial institution,
   the digital token service provider, and
   the third-party wallet.

7. A non-transitory computer-readable medium which contains of set of instructions, which when executed, perform a method comprising:
   providing a tokenization service on an intermediary server;
   selecting, by the intermediary server, an account tokenized by the tokenization service for which sharing privileges are to be offered;
   defining, by the intermediary server, constraints upon the sharing privileges to the account, the constraints comprising at least one of the following:
      an identification of at least one recipient to receive the sharing privileges,
      a time for enabling and disabling the sharing privileges,
      an amount of asset value within the account to be conveyed with the sharing privileges,
      a quantity of transactions to be permitted with the account,
      at least one vendor approved for transaction with the account, and
      at least one type of transaction available for the sharing privileges;
   sending, from the intermediary server, a request for a digital token for the account, wherein sending the request for the digital token comprises sending the request to at least one of the following:
      a financial institution associated with the account, wherein the intermediary server operates independently of the financial institution,
      a digital tokenization service provider associated with the financial institution associated with the account, wherein the intermediary server operates independently of the digital tokenization service provider, and
      a digital wallet associated with the account;
   receiving, at the intermediary server, the digital token for the account;
   providing access to the digital token to a network-accessible device associated with a recipient of shared access privileges through a controlled interface, the controlled interface providing at least one of the following:
      an encryption of the digital token as a virtual identifier, and
      a communication means for interacting with at least one of the following:
         a physical POS terminal,
         an e-commerce terminal, and
         an ATM;
   receiving, at the intermediary server and from the network-accessible device associated with the recipient, a request to utilize the digital token through the controlled interface for performing a transaction, wherein receiving the request comprises receiving transaction details associated with the request;
   verifying, by the intermediary server, whether the transaction details are within the constraints established for the account; and
   responsive to determining that the transaction details are within the constraints:
      applying the digital token to perform the transaction, wherein the applying the digital token comprises:
         selecting, by a receiver via the controlled interface, the shared account,
         receiving, from the receiver via the controlled interface, a request to perform the transaction using the shared account,
         using the controlled interface to make the virtual identifier comprising the encrypted digital token available to a third party for use in completing the transaction, and
         causing a transfer of asset value from the shared account to facilitate the transaction in response to the application of the digital token.

8. The non-transitory computer-readable medium of claim 7, wherein selecting the account for which sharing privileges are to be offered comprises:
   receiving, to the intermediary server and from a network-accessible device associated with an account holder of the account, an offer for the sharing privileges;
   transmitting, by the intermediary server, a notification of the offer for sharing privileges to the network-accessible device associated with the recipient; and
   receiving, at the intermediary server and from the network-accessible device associated with the recipient, an acceptance of the sharing privileges for the recipient.

9. The non-transitory computer-readable medium of claim 7, wherein sending the request for the digital token to the financial institution associated with the account comprises communicating with a preferred token service provider affiliated with the financial institution.

10. The non-transitory computer-readable medium of claim 7, wherein the communication means for interacting with the POS terminal comprises a near field communication protocol.

11. The non-transitory computer-readable medium of claim 7, wherein the communication means for interacting with the POS terminal comprises utilization of a QR code.

12. The non-transitory computer-readable medium of claim 7, wherein the intermediary server is integrated into at least one of the following:
   the financial institution,
   the digital token service provider, and
   the third-party wallet.

* * * * *